United States Patent
Fukawatase

(10) Patent No.: US 9,493,135 B2
(45) Date of Patent: Nov. 15, 2016

(54) ROOF AIRBAG DEVICE AND OCCUPANT PROTECTION DEVICE

(71) Applicant: Toyota Jidosha Kabushiki Kaisha, Toyota-shi, Aichi-ken (JP)

(72) Inventor: Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/314,681

(22) Filed: Jun. 25, 2014

(65) Prior Publication Data

US 2014/0375033 A1    Dec. 25, 2014

(30) Foreign Application Priority Data

Jun. 25, 2013    (JP) ................................. 2013-132670

(51) Int. Cl.
- *B60R 21/231* (2011.01)
- *B60R 21/214* (2011.01)
- *B60R 21/232* (2011.01)

(52) U.S. Cl.
CPC ........... *B60R 21/231* (2013.01); *B60R 21/214* (2013.01); *B60R 21/232* (2013.01); *B60R 2021/23161* (2013.01)

(58) Field of Classification Search
CPC .............. B60R 21/23138; B60R 2021/23161; B60R 21/232; B60R 21/233; B60R 21/231; B60R 21/214
USPC ........................................................ 280/729
See application file for complete search history.

(56) References Cited

U.S. PATENT DOCUMENTS

| | | | | |
|---|---|---|---|---|
| 3,731,949 A * | 5/1973 | Radke | ................... | B60R 21/232 182/138 |
| 5,439,247 A * | 8/1995 | Kolb | ................. | B60R 21/23138 280/729 |
| 5,470,103 A * | 11/1995 | Vaillancourt | ......... | B60R 21/214 280/730.1 |
| 6,773,026 B2 * | 8/2004 | Meyer | ................... | B60R 21/231 280/729 |
| 7,222,877 B2 * | 5/2007 | Wipasuramonton | .. | B60R 21/214 280/729 |
| 7,377,544 B2 * | 5/2008 | Itoga | ................... | B60N 2/42718 180/268 |
| 7,681,907 B2 * | 3/2010 | Svenbrant | ............. | B60R 21/207 280/728.2 |
| 8,152,197 B2 * | 4/2012 | Taguchi | ................ | B60R 21/207 280/728.2 |
| 8,651,518 B2 * | 2/2014 | Shamoto | ................ | B60N 2/289 280/730.2 |
| 2004/0188988 A1 * | 9/2004 | Wipasuramonton | .. | B60R 21/214 280/730.1 |
| 2006/0192370 A1 * | 8/2006 | Abe | ..................... | B60R 21/0132 280/735 |

(Continued)

FOREIGN PATENT DOCUMENTS

| | | |
|---|---|---|
| JP | 04-091552 U1 | 8/1992 |
| JP | 06-80057 A | 3/1994 |

(Continued)

*Primary Examiner* — Karen Beck
(74) *Attorney, Agent, or Firm* — Dinsmore & Shohl LLP

(57) ABSTRACT

A roof airbag device includes a roof airbag housed in a part that includes a front end side in a vehicle longitudinal direction in a center part in a vehicle width direction of a roof. The roof airbag includes: a front deployed part that is deployed in front in a vehicle longitudinal direction with respect to an occupant such that a lower end side in a vehicle up-and-down direction overlaps with an instrument panel in an up-and-down direction in a rear view; a rear deployed part that is at least partially deployed between right and left seats; and a thin deployed part that is deployed in a state connected with the front deployed part and the rear deployed part and surrounded by these deployed part, and in non-inflation or in inflation at a thickness thinner than an inflation width of the inflated and deployed part in a vehicle width direction.

19 Claims, 6 Drawing Sheets

(56) References Cited

U.S. PATENT DOCUMENTS

| | | | | |
|---|---|---|---|---|
| 2009/0001695 A1* | 1/2009 | Suzuki | ............... | B60R 21/231 |
| | | | | 280/730.2 |
| 2010/0140909 A1 | 6/2010 | Jang | | |
| 2010/0283230 A1* | 11/2010 | Tomitaka | ............ | B60R 21/231 |
| | | | | 280/730.2 |
| 2011/0278826 A1 | 11/2011 | Fukawatase et al. | | |
| 2014/0097601 A1* | 4/2014 | Fukawatase | ......... | B60R 21/231 |
| | | | | 280/730.2 |
| 2014/0375033 A1* | 12/2014 | Fukawatase | ......... | B60R 21/214 |
| | | | | 280/729 |

FOREIGN PATENT DOCUMENTS

| | | |
|---|---|---|
| JP | 06-206510 A | 7/1994 |
| JP | 2003-267177 A | 9/2003 |
| JP | 2007-223525 A | 9/2007 |
| JP | 2008-100604 A | 5/2008 |
| JP | 2009-154709 A | 7/2009 |
| JP | 2009-255677 A | 11/2009 |
| JP | 2010-076642 A | 4/2010 |
| JP | 2011-116153 A | 6/2011 |
| WO | 2009035116 A1 | 3/2009 |
| WO | 2010050015 A1 | 5/2010 |

* cited by examiner

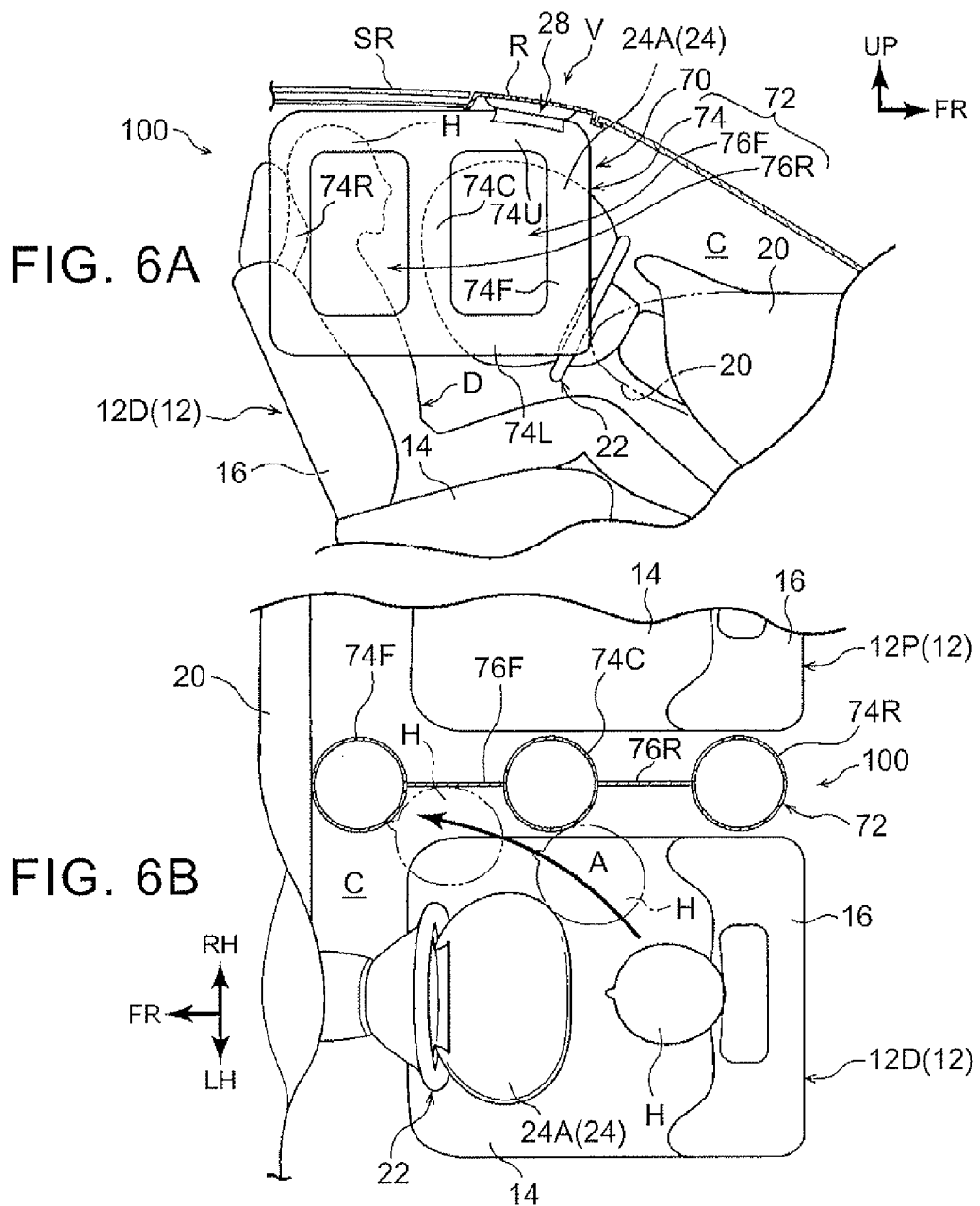

ROOF AIRBAG DEVICE AND OCCUPANT PROTECTION DEVICE

INCORPORATION BY REFERENCE

The disclosure of Japanese Patent Application No. 2013-132670 filed on Jun. 25, 2013 including the specification, drawings and abstract is incorporated herein by reference in its entirety.

BACKGROUND OF THE INVENTION

1. Field of the Invention

The present invention relates to a roof airbag device and an occupant protection device.

2. Description of Related Art

A device that deploys an airbag toward between right and left seats from a roof of a vehicle at the time of side impact has been known (see Japanese Patent Application Publication No. 2007-223525 (JP 2007-223525 A) and Japanese Patent Application Publication No. 2009-154709 (JP 2009-154709 A), for example).

However, technologies disclosed in JP 2007-223525 A and JP 2009-154709 A are technologies for protecting an occupant from side impact and cannot suppress an occupant from moving diagonally forward toward a center side in a vehicle width direction of an instrument panel.

SUMMARY OF THE INVENTION

The present invention provides a roof airbag device and an occupant protection device which can suppress a seated occupant from moving to a center side of an instrument panel in a vehicle width direction in the case of a front impact at a position that is offset on one side in the vehicle width direction.

A first aspect of the present invention relates to a roof airbag device. The roof airbag device includes a roof airbag housed in a part that contains a front end side in a vehicle longitudinal direction in a center part in a vehicle width direction of a roof. The roof airbag is configured to include a front deployed part that is inflated upon reception of gas supply and is deployed in front in a vehicle longitudinal direction with respect to an occupant such that a low end side in an vehicle up-and-down direction overlaps with an instrument panel in an up-and-down direction in a rear view; a rear deployed part that is inflated upon reception of gas supply and is at least partially deployed between right and left seats; and a thin deployed part that is deployed in a state connected with an inflated and deployed part that includes the front deployed part and the rear deployed part and surrounded by the inflated and deployed part and in non-inflation or inflation at a thickness thinner than an inflated thickness in a vehicle width direction of the inflated and deployed part.

In the roof airbag device according to the aspect described above, when the rear deployed part of the roof airbag is deployed between right and left seats (between seat bags, for example), a state where load from right and left can be supported is obtained. Here, in the case of a front impact to a position that is offset to one side in a vehicle width direction, a seated occupant on an anti-impact side is moved also to an impact side while moving forward by inertia. In this case, mainly a head of the seated occupant reaches the front deployed part while being guided along a thin-deployed part of a deployed roof airbag and is suppressed from moving forward by the front deployed part. Therefore, the head of the seated occupant is suppressed from coming into contact with a center side part of the instrument panel in a vehicle width direction.

Thus, according to the roof airbag device of the aspect described above, the seated occupant can be suppressed from moving to a center side in the vehicle width direction of the instrument panel in the case of a front impact at a position that is offset to one side in the vehicle width direction.

A second aspect of the present invention relates to an occupant protection device. The occupant protection device includes: an airbag device for front seat that is disposed in front with respect to a seat and inflates and deploys a front impact airbag by gas supply in the case of a front impact and at the time of a front impact at a position that is offset to one side in a vehicle width direction in a vehicle front part; and a roof airbag device of the aspect described above which inflates and deploys the roof airbag by gas supply in the case of a front impact at a position that is offset to one side in a vehicle width direction in a vehicle front part.

According to the aspect described above, the roof airbag and the front impact airbag are deployed in the case of a front impact at a position that is offset to one side in the vehicle width direction. The occupant is prevented or effectively suppressed from coming into contact with the instrument panel by the front deployed part of the roof airbag device even when an amount of movement of a seated occupant on an anti-impact side to an impact side is large and the front impact airbag cannot restrain the occupant.

As described above, the roof airbag devices according to the first and second aspects of the present invention have an excellent effect such that the seated occupant can be suppressed from moving to a center side in the vehicle width direction of the instrument panel in the case of a front impact at a position that is offset to one side in the vehicle width direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A is a diagram that shows a center roof airbag device according to a fourth embodiment of the present invention and a side view that shows a schematic entire structure; and FIG. 6B is a diagram that shows a center roof airbag device according to a fourth embodiment of the present invention and a plan view for describing an occupant protection mode.

DETAILED DESCRIPTION OF EMBODIMENTS

An occupant protection device 100 that includes a center roof airbag device 10 as a roof airbag device according to an embodiment of the present invention (hereinafter, referred to as "CR airbag device 10"), and a CR airbag device 10 will be described with reference to FIG. 1 to FIG. 3. An arrow mark FR, an arrow mark UP, an arrow mark RH, and an arrow mark LH, which are optionally used in the respective drawings, respectively show a front direction, an upper direction, a right side that is one side in the vehicle width direction, and a left side that is the other side of a vehicle V in which the CR airbag device 10 and the occupant protection device 100 are applied. Hereinafter, when description is provided simply with directions of front and rear, above and below, and right and left, unless clearly stated otherwise, these respectively show front and rear in a vehicle longitudinal direction, above and below in a vehicle up-and-down direction, and right and left of the vehicle (when faced to a front side).

(Schematic Structure of the Inside of Vehicle V)

Figure 1:
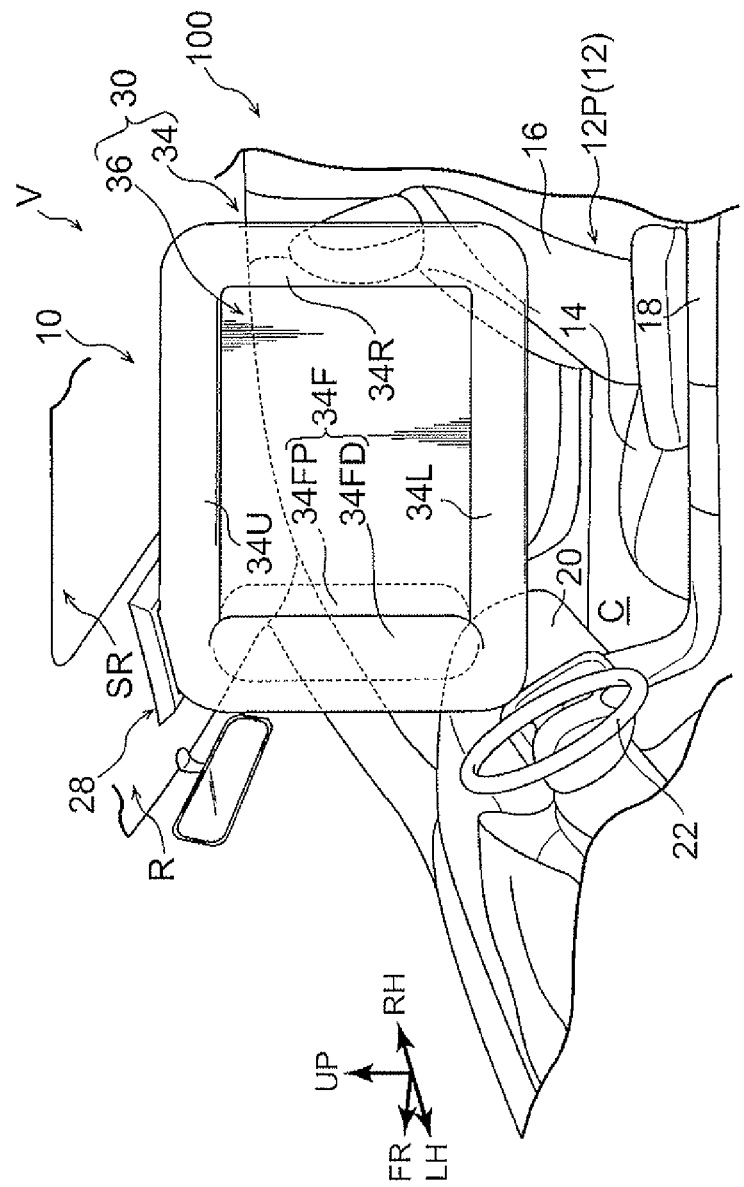
FIG. 1 is a perspective view that shows a schematic entire structure of a center roof airbag device according to a first embodiment of the present invention.
Figure 2A:
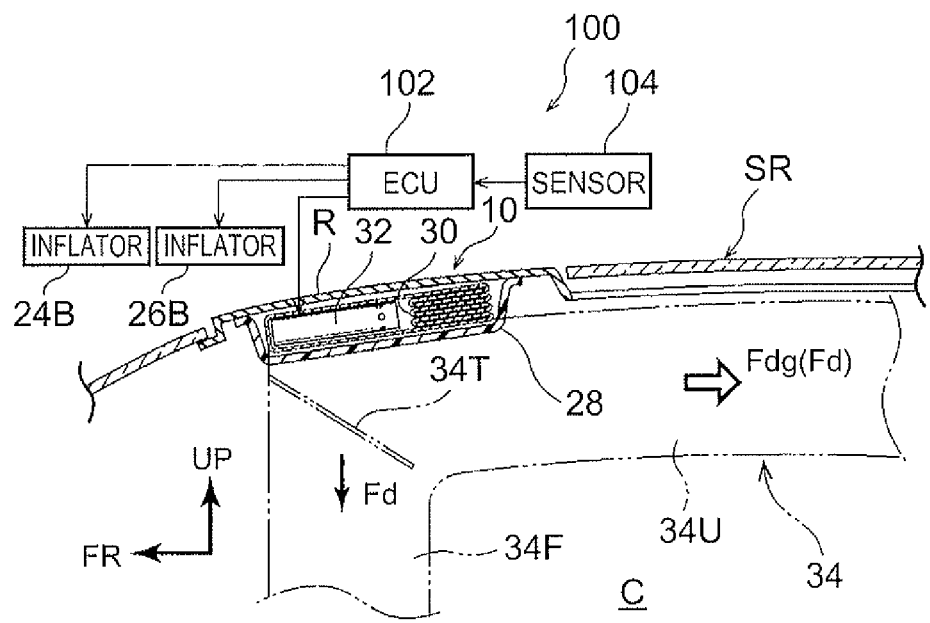
FIG. 2A is a diagram that shows the center roof airbag device according to the first embodiment of the present invention and a cross-sectional side view that shows a housing state by enlarging.

In FIG. 1, a front end inside of a cabin C of a vehicle V to which the CR airbag device 10 is applied is shown in a schematic perspective view. Further, in FIG. 3, the front part inside of a cabin C of the vehicle V is shown in a schematic plan view. As shown in these diagrams, in the inside of the cabin C, a pair of right and left vehicle seats 12 is arranged in parallel in right and left. Each of the vehicle seats 12 is formed by including a seat cushion 14 and a seat bag 16 a lower end of which is connected to a rear end of the seat cushion 14.

According to this embodiment, the vehicle seat 12 located on a left side is a driver's seat 12D and the vehicle seat 12 located on a right side is an assistant driver's seat 12P. In FIG. 1, although the driver's seat 12D is omitted from showing, a center console 18 is disposed between the driver's seat 12D and the assistant driver's seat 12P. A front end of the center console 18 is connected to a center part in the vehicle width direction of the instrument panel 20 that extends in a vehicle width direction in front of the driver's seat 12D and the assistant driver's seat 12P. A steering wheel 22 is disposed on the driver's seat 12D side in the instrument panel 20.

At a front end part of a roof R in a center part in the vehicle width direction of the vehicle V, an overhead console 28 is disposed. The overhead console 28 is provided with switches and lightings in block, which are not shown in the drawing. According to this embodiment, a sun roof device SR is disposed behind the overhead console 28 in the roof R.

(Airbag Device for Front Impact)

Figure 3:
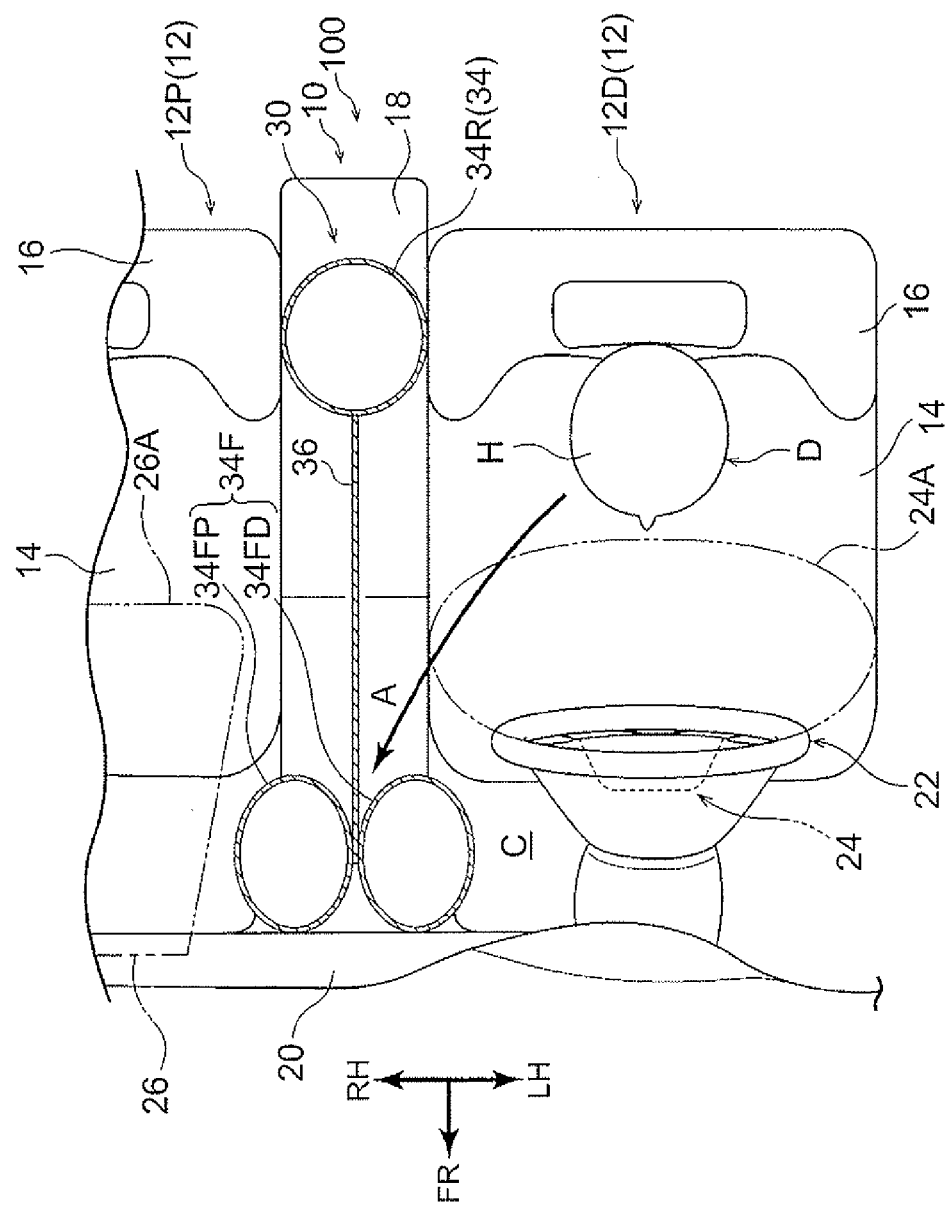
FIG. 3 is a plan view for describing the occupant protection mode by the center roof airbag device according to the first embodiment of the present invention.

As shown in FIG. 3, the occupant protection device 100 includes an airbag device 24 for a driver's seat for protecting a seated occupant D on the driver's seat 12D from the front impact and an airbag device 26 for an assistant driver's seat for protecting a seated occupant on the assistant driver's seat 12P (not shown in the drawing) from the front impact. At least one of the airbag device 24 for a driver's seat and the airbag device 26 for an assistant driver's seat corresponds to an airbag device for a front seat of the present invention.

The airbag device 24 for driver's seat is disposed inside of the steering wheel 22 and inflates and deploys an airbag 24A in front of the driver's seat 12D when an inflator 24B (see FIG. 2A) is activated. On the other hand, the airbag device 26 for assistant driver's seat is disposed in a front part of the assistant driver's seat 12P in the instrument panel 20 and inflates and deploys an airbag 26A in front of the assistant driver's seat 12P when an inflator 26B (see FIG. 2A) is activated.

(Structure of CR Airbag Device)

In FIG. 2, a schematic structure of the CR airbag device 10 before activation is shown with a cross-sectional side view. As shown in the drawing, the CR airbag device 10 is formed by including a center roof airbag 30 as a roof airbag that is inflated and deployed upon reception of a gas supply (hereinafter, referred to as "CR airbag 30") and an inflator 32 that supplies a gas to the CR airbag 30. The CR airbag 30 and the inflator 32 are housed in the overhead console 28.

As shown in FIG. 1, the CR airbag 30 is formed by including a duct part 34 as an inflated and deployed part that is inflated and deployed upon reception of a gas supply; and a sheet-like deployed part 36 as a thin deployed part that is deployed without inflating as the duct part 34 deploys. The duct part 34 is formed into an annular duct that forms a rectangular frame shape in a side view, and the sheet-like deployed part 36 is deployed in sheet by tensional force inside of the duct part 34. Hereinafter, a concrete description will be given.

The duct part 34 includes a front duct 34F as a front deployed part, a rear duct 34R as a rear deployed part, an upper duct 34U as an upper deployed part, and a lower duct 34L as a lower deployed part, and is inflated and deployed into a rectangular frame shape in a side view as shown above. That is the upper duct 34U connects between upper ends of the front duct 34F and the rear duct 34R, and the lower duct 34L connects between lower ends of the front duct 34F and the rear duct 34R. The front duct 34F is formed to be inflated and deployed such that the lower end of the front duct 34F (front end of the lower duct 34L) overlaps with the instrument panel 20 in a up-and-down direction in a rear view. In a state before contact with a head H described below, the lower end of the front duct 34F (front end of the lower duct 34L) may be formed to come into contact with the instrument panel 20 or not to come into contact with the instrument panel 20.

In this embodiment, the rear duct 34R, the upper duct 34U, and the lower duct 34L are formed to be inflated and deployed as a single duct forming a cylinder. On the other hand, the front duct 34F is formed such that a pair of cylindrical ducts 34FD and 34FP are inflated and deployed arranged in parallel in right and left. The cylindrical dust 34FD is formed to be inflated and deployed on the driver's seat 12D side, and the cylindrical duct 34FP is formed to be inflated and deployed on the assistant driver's seat 12P side.

Further, the CR airbag 30 is formed to be inflated and deployed such that at least a part of the rear duct 34R overlaps with each of the seat back 16 of the driver's seat 12D and the seat back 16 of the assistant driver's seat 12P in a side view. That is, in an entire range where the vehicle seat 12 is positionally adjusted in a longitudinal direction by a seat slide mechanism not shown in the drawing, at least a part of the rear duct 34R is inflated and deployed between right and left seat backs 16. In other words, at least a part of the rear duct 34R is formed to be inflated and deployed so as to overlap with any one of the right and left seat backs 16 in a side view irrespective of a position in a longitudinal direction of the right and left seat backs 16.

Thus, the CR airbag 30, while being supported by any one of the seat backs 16 of the driver's seat 12D and the assistant driver's seat 12P (while obtaining a reaction force by interference with the seat back 16), protects a seated occupant as described below. At least a part of the rear duct 34R and the lower duct 34L may be formed to be inflated and deployed between the right and left seat backs 16 in an entire range where the vehicle seat 12 is positionally adjusted in a longitudinal direction by a seat slide mechanism not shown in the drawing. In this case, (a part of) the rear duct 34R and lower duct 34L corresponds to a rear deployed part of the present invention.

The sheet-like deployed part 36 is formed into a shape that is deployed into a rectangular shape in a side view and a circumference thereof is connected with an inner periphery of the duct part 34 over a near entire length. In this embodiment, a forward edge of the sheet-like deployed part 36 is connected between the cylindrical ducts 34FD and 34FP by sewing or the like. An upper edge, a rear edge, and a lower edge of the sheet-like deployed part 36 are connected to center parts of the upper duct 34U, the rear duct 34R, and the lower duct 34L in a vehicle width direction by sewing or the like. Thus, the sheet-like deployed part 36 is deployed in sheet by tensional force accompanying deployment of the duct part 34 as described above. The sheet-like deployed part 36 is formed of, for example, a material that is the same as foundation cloth that forms the duct part 34 or a net (net-like) raw material. That is, a sheet-like member may be formed as a cloth-like member or a mesh-like member.

The CR airbag 30 described above is housed in the overhead console 28 in a state of properly folded as shown in FIG. 2. In this embodiment, the CR airbag 30 is fixed to the roof R in a part that is a front end of the upper duct 34U in an inflated and deployed state via the inflator 32 incorporated in the upper duct 34U.

Figure 2B:
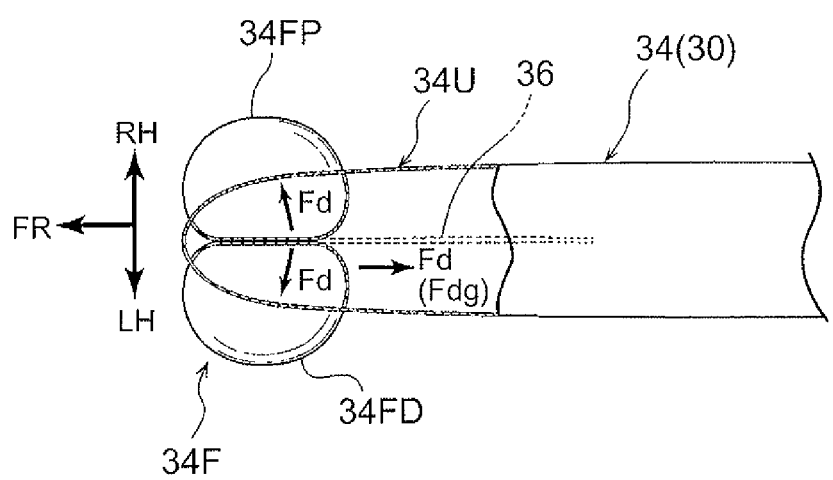
FIG. 2B is a diagram that shows the center roof airbag device according to the first embodiment of the present invention and a cross-sectional view that shows a coupling state between an upper duct part and a front duct part by partially notching.

As the inflator 32, a combustion type or a cold gas type is adopted, and a gas generated by activation is supplied to the inside of the CR airbag 30. In this embodiment, the gas from the inflator 32 is partitioned (see an arrow mark Fd) via the front end of the upper duct 34U to the right and left cylindrical ducts 34FD and 34FP of the front duct 34F, and the rear part of the upper duct 34U as shown in FIG. 2B.

Here, it is preferable to supply the gas in a short time from activation of the inflator 32 to the rear duct 34R that obtains reaction force due to interference with the seat back 16. Therefore, in the present embodiment, a partition structure that promotes a gas flow Fdg that flows the upper duct 34U toward the rear may be disposed. The partition structure may be formed by a tether 34T that is deployed to direct upward and backward as shown by an imaginary line in, for example, FIG. 2A, or may be set by cross-sectional areas of flow passages or opening areas on gas input sides of the cylindrical ducts 34FD, 34FP, and the upper duct 34U, which are omitted from showing in the drawings.

(Occupant Protection ECU)

The occupant protection device 100 includes an occupant protection ECU 102 as a control device. The occupant protection ECU 102 is electrically connected to a plurality of impact sensors 104 (one is shown in a block in FIG. 2), and, the respective inflators 24B and 26B for the airbag device 24 for driver's seat and the airbag device 26 for assistant driver's seat, and the inflator 32 of the CR airbag device 10. The occupant protection ECU 102 can detect the front impact, the side impact, rollover, a very small lap impact and a diagonal impact (occurrence or inevitability) to an applied vehicle V based on information from the impact sensor 104.

Here, the very small lap impact is an impact an amount of lap of which in the vehicle width direction with an impact partner defined by, for example, IIHS of the front impact of a vehicle V is 25% or less. For example, an impact on the outside in the vehicle width direction to a front side member that is a vehicle skeleton corresponds to the very small lap impact. In this embodiment, the very small lap impact at a relative speed of 64 km/hr is assumed as an example. Further, the diagonal impact (MDB impact, oblique impact) means a diagonal front impact (as an example, an impact at a relative angle with an impact partner of 15° and an impact in which an amount of lap in the vehicle width direction is about 35%) defined by, for example, NHSTA. In this embodiment, the diagonal impact at a relative speed of 90 km/hr is assumed as an example.

The occupant protection ECU 102 activates inflators of the airbag device 24 for driver's seat and the airbag device 26 for assistant driver's seat, for example, when a front impact such as a full lap front impact or an offset front impact is detected. Further, the occupant protection ECU 102 activates the inflator 32 of the CR airbag device 10 when the side impact or the rollover is detected. Still further, the occupant protection ECU 102 activates the respective inflators of the airbag device 24 for driver's seat and the airbag device 26 for assistant driver's seat and the inflator 32 of the CR airbag device 10 when a very small lap impact or the diagonal impact is detected. Regarding the airbag device 26 for assistant driver's seat, the inflator may be activated on the condition that an occupant is seated on the assistant driver's seat 12P.

[Operation]

Next, an operation of the present embodiment will be described.

Hereinafter, an operation of the CR airbag device 10 will be described mainly for the case where the occupant protection ECU 102 detected the very small lap impact or the diagonal impact on the assistant driver's seat 12P side.

The occupant protection ECU 102, when detected that the very small lap impact or the diagonal impact occurred based on signals from the respective impact sensors, activates the respective inflators of the airbag device 24 for driver's seat and the airbag device 26 for assistant driver's seat and the inflator 32 of the CR airbag device 10. Then, as shown by an imaginary line in FIG. 3, the respective airbags 24A and 26A of the airbag device 24 for driver's seat and the airbag device 26 for assistant driver's seat are inflated and deployed.

Further, when the inflator 32 of the CR airbag device 10 is activated, as shown in FIG. 1 and FIG. 3, the CR airbag 30 is deployed. That is, the duct part 34 is inflated and deployed and accompanying this, the sheet-like deployed part 36 is deployed in sheet. Here, in the case of the very small lap impact or the diagonal impact on the assistant driver's seat 12P side, a seated occupant (driver) D of the driver's seat 12D moves forward relative to a vehicle body and further moves inward in the vehicle width direction, that is, also to an impact side (see arrow mark A in FIG. 3). When an amount of movement to an impact side of a head H of the seated occupant D, that is, an amount of offset in the vehicle width direction relative to the airbag 24A of the airbag device 24 for driver's seat is large, the head H cannot be restrained by the airbag 24A.

In such a case, the head H of the seated occupant D reaches the front duct 34F of the CR airbag 30, while being guided by the sheet-like deployed part 36 of the CR airbag 30 supported by the seat back 16 in the rear duct 34R. The head H of the seated occupant D is prevented or effectively suppressed from coming into contact with the instrument panel 20 by contact (interference) with the cylindrical duct 34FD of the front duct 34F.

Although omitted from showing in the drawing, when the head of the seated occupant on the assistant driver's seat 12P is largely moved to the impact side by the very small lap impact or the diagonal impact on the driver's seat 12D side, the head of the seated occupant of the assistant driver's seat 12P comes into contact (interfere) with the cylindrical duct 34FP of the front duct 34F. Thus, the head of the seated occupant on the assistant driver's seat 12P is prevented or effectively suppressed from coming into contact with the instrument panel 20.

When the head of the seated occupant is protected, the rear duct 34R deployed while overlapping with the right and left seat backs 16 supports reaction force. In particular, in a structure that has a partition structure for promoting a gas flow Fdg from the inflator 32 via the upper duct 34U toward the rear side, in a short time after an operation start of the inflator 32, the rear duct 34R can be inflated and deployed so as to overlap with the right and left seat backs 16. This contributes to improving an occupant protection performance.

Thus, in the CR airbag device 10 according to the present embodiment, in the case of the front impact to a position that is offset to one side in the vehicle width direction such as the very small lap impact or the diagonal impact, the seated occupant on the anti-impact side can be suppressed from moving to a center side in the vehicle width direction of the instrument panel 20.

Further, since the front duct 34F of the CR airbag 30 contains a pair of right and left cylindrical ducts 34FD and 34FP, for both impacts on right and left sides, the seated occupant on the anti-impact side can be effectively suppressed from moving to a center side of the instrument panel 20 in the vehicle width direction.

Further, while the duct part 34 is made an inflated and deployed part in the CR airbag 30, since the sheet-like deployed part 36 is a non-inflated part, the CR airbag 30 has a small capacity. Therefore, the CR airbag 30 completes deployment in a short time from an activation start of the inflator 32 and contributes to improving the protection performance of the seated occupant.

Furthermore, since the capacity of the CR airbag 30 is small, the CR airbag device 10 can compactly be housed in a narrow space in front of the sun roof device SR in the roof R. In this embodiment, since the CR airbag device 10 is housed in the overhead console 28, without disgracing appearance, the CR airbag device 10 can readily be mounted in the roof R (above the seated occupant). That is, when the present structure is adopted, the mountability of the CR airbag device on the roof R is high.

The CR airbag 30 has the duct part 34 that has a rectangular frame-like shape in a side view and the sheet-like deployed part 36 is connected to at least the front duct 34F, the upper duct 34U, and the lower duct 34L. Therefore, the head H that is in contact with the sheet-like deployed part 36 is properly guided by the sheet-like deployed part 36 toward the front duct 34F. That is, guiding performance of the head of the seated occupant by the sheet-like deployed part 36 to the front duct 34F is excellent.

[Other Embodiments]

Hereinafter, other embodiments will sequentially be described. Since the respective embodiments shown below are different from the first embodiment described above in a structure of a CR airbag device that forms the occupant protection device 100, the different point will mainly be described. Further, for a structure that is fundamentally the same as the structure of the embodiment described above, the reference numerals that is the same as those of the embodiments described above are given, and the description and illustration thereof will be omitted in some cases.

<Second Embodiment>

Figure 4:
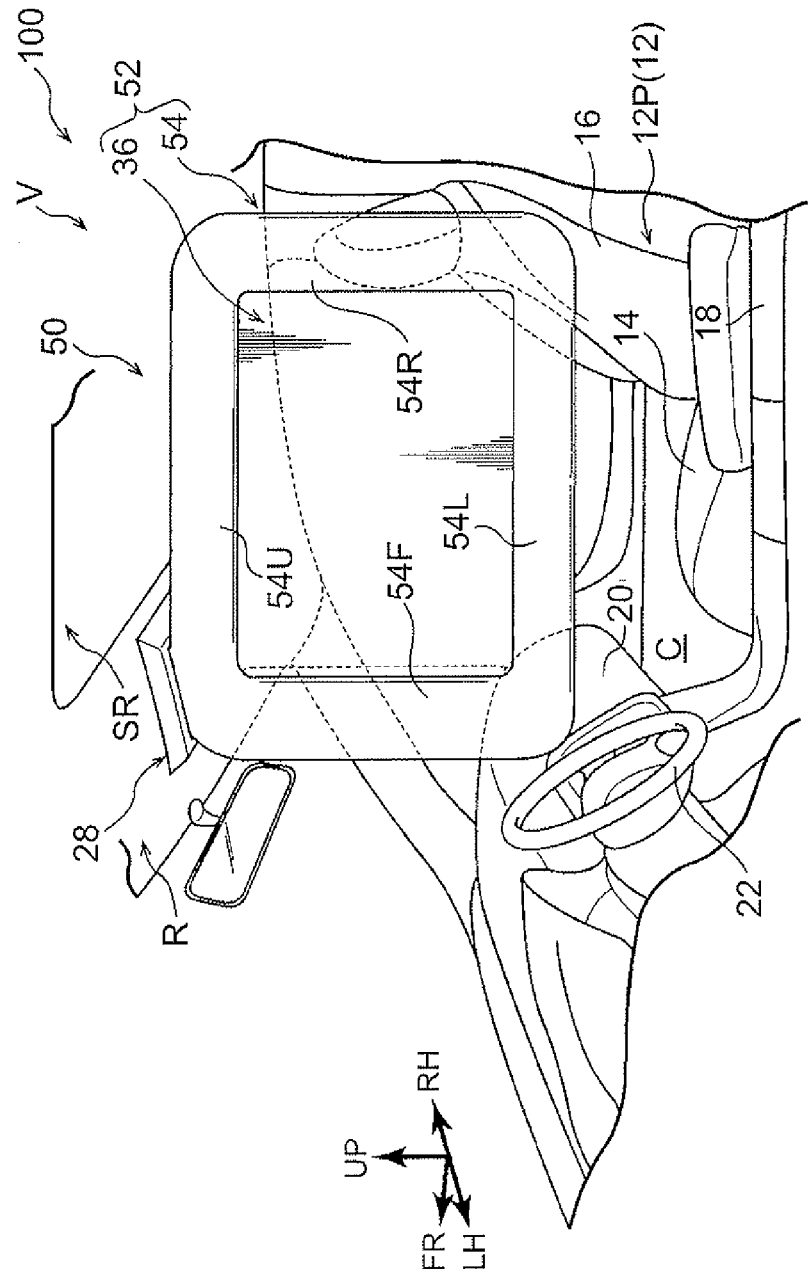
FIG. 4 is a perspective view that shows a schematic entire structure of a center roof airbag device according to a second embodiment of the present invention.

A CR airbag device 50 according to a second embodiment of the present invention will be described based on FIG. 4. In FIG. 4, a CR airbag 52 as an airbag that forms the CR airbag device 50 is shown in a perspective view corresponding to FIG. 1. As shown in the drawing, the CR airbag 52 is different from the first embodiment in which the front duct 34F is formed of a pair of right and left front ducts 34FD and 34FP in a point that a front duct 54F of a duct part 54 is formed of a single cylindrical duct.

The duct part 54 of the CR airbag 52 is formed into a rectangular frame-like shape in a side view, and an upper duct 54U, a rear duct 54R, and a lower duct 54L thereof are formed in the same manner as the upper duct 34U, the rear duct 34R and the lower duct 34L, which are described above. On the other hand, the front duct 54F forms a cylindrical shape that extends in the above and below in the same manner as the rear duct 54R and connects between front ends of the upper duct 54U and the lower duct 54L.

Then, a rim of the sheet-like deployed part 36 is joined to a center part in the vehicle width direction of the front duct 54F, upper duct 34U, rear duct 34R and lower duct 34L over a nearly whole circumference by sewing or the like. Other structures of the CR airbag device 50 are formed in the same manner as the CR airbag device 10 in the first embodiment including parts not shown in the drawings.

Therefore, also by the CR airbag device 50 according to the second embodiment, the same effect can be obtained by fundamentally the same operation as the CR airbag device 10 according to the first embodiment except the operation and effect due to that the front duct is formed of a pair of right and left cylindrical ducts. Further, since the sheet-like deployed part 36 is connected to a center part in the vehicle width direction of the front duct 54F in the CR airbag 52, the front duct 54F can protect the seated occupant on the anti-impact side even for the impact that is offset on any side of right and left sides of the vehicle.

Further, since, in the CR airbag 52, the front duct 54F that forms the duct part 54 that is an inflated and deployed part is formed of a single cylindrical duct, a capacity of the inflated and deployed part is small. Therefore, the CR airbag 52 completes inflation and deployment in a further shorter time from an operation start of the inflator 32 and contributes to improving the occupant protection performance.

<Third Embodiment>

Figure 5:
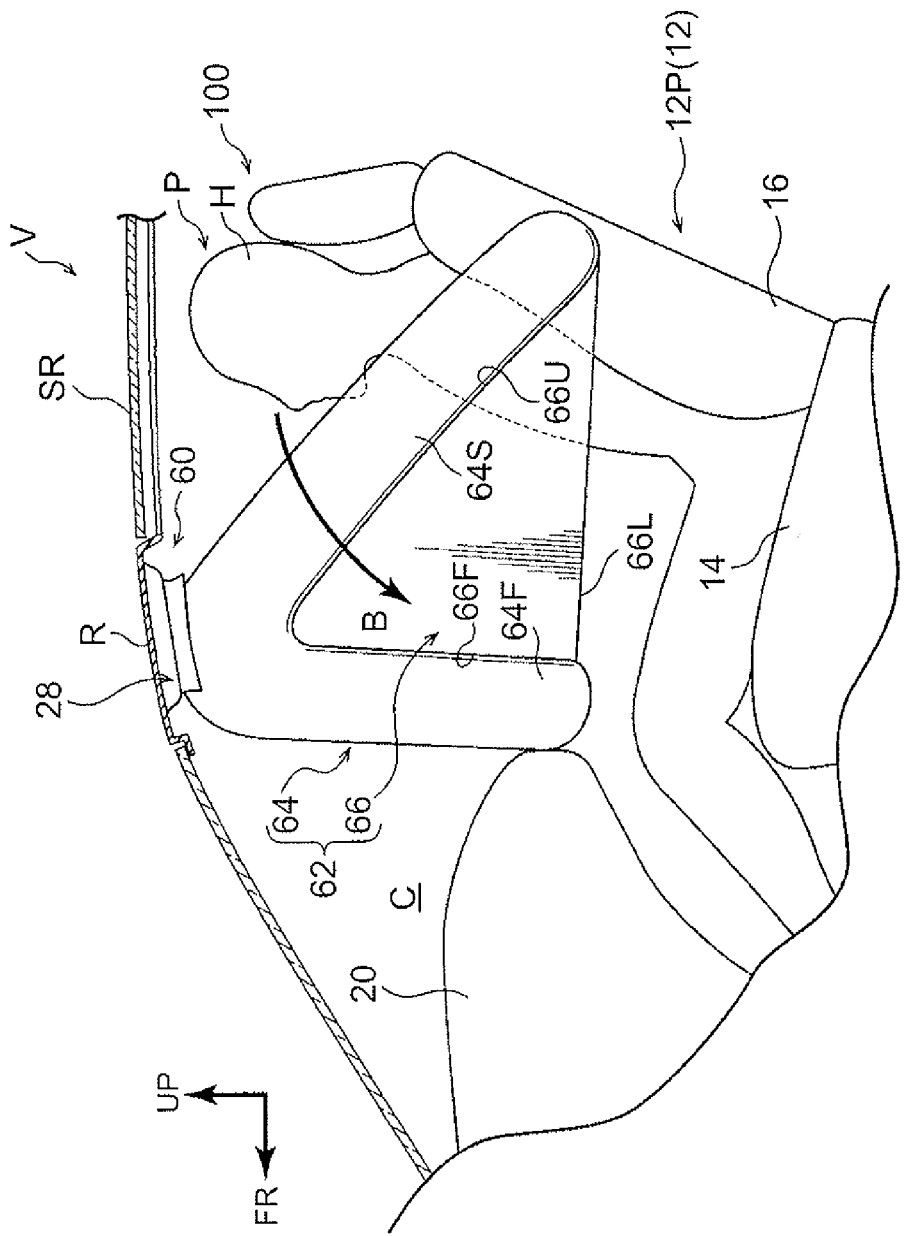
FIG. 5 is a side view that shows a schematic entire structure of a center roof airbag device according to a third embodiment of the present invention.

A CR airbag device 60 according to a third embodiment of the present invention will be described based on FIG. 5. In FIG. 5, a schematic entire structure in an operation state of the CR airbag device 60 is shown in a schematic side view. As shown in this drawing, a CR airbag 62 as an airbag that forms the CR airbag device 60 is different from the first embodiment in which the duct part 34 forms a rectangular frame-like shape, in a point that it has a nearly inverse "V" character-like duct part 64.

Specifically, the duct part 64 is formed with a front duct 64F and a diagonal duct 64S as a diagonal cylindrically deployed part that is a rear deployed part. The front duct 64F is inflated and deployed as a single cylindrical duct that extends in the above and below. The diagonal duct 64S is inflated and deployed in a posture that is inclined such that a front side part is positioned above a rear side part and a front upper end is connected to an upper end of the front duct 64F.

The diagonal duct 64S is formed such that, in an inflated and deployed state, the lower back part thereof overlaps with right and left seat backs 16 in a side view (is deployed between right and left seat backs 16). A rear part of the diagonal duct 64S in this embodiment is disposed to a position corresponding to a position of a lower end of the rear duct 34R or the rear end of the lower duct 34L in the first embodiment.

Further, the CR airbag 62 has a sheet-like deployed part 66 that is deployed in a near rectangular triangle shape in a side view. The sheet-like deployed part 66 has a forward edge 66F that is connected to a center in the vehicle width direction in a rear part of the front duct 64F and an upper edge 66U that is connected to a center in the vehicle width direction in a lower part of the diagonal duct 64S. On the other hand, a lower edge 66L of the sheet-like deployed part 66 is formed into a free end (non-restrained site).

This sheet-like deployed part 66 is deployed in sheet by tensional force as the duct part 64 is deployed. The sheet-like deployed part 66 is formed of, for example, a material that is the same as the base cloth that forms the duct part 64 or a net (net-like) raw material. Other structures of the CR airbag device 60 are formed in the same manner as the CR airbag device 10 in the first embodiment including parts not shown in the drawings.

Therefore, also by the CR airbag device 60 according to the third embodiment, the same effect can be obtained by a fundamentally the same operation as the CR airbag device 10 according to the first embodiment except the operation and effect due to that the front duct is formed of a pair of right and left cylindrical ducts. When the occupant protection by the CR airbag 62 is complemented, in the case of the very small lap impact or the diagonal impact, the head H of the seat-belted seated occupant P, while moving forward and downward as shown with an arrow mark B in FIG. 5, moves to an impact side as shown with an arrow mark A in FIG. 3. Therefore, the head H comes into contact with the sheet-like deployed part 66 forward and downward relative to the diagonal duct 64S and is guided to the front duct 64F in the sheet-like deployed part. Then, the CR airbag 62 effectively suppresses the head H from coming into contact with the instrument panel 20 while supporting a reaction force by bringing a rear lower end of the diagonal duct 64S that is a rear part of the CR airbag 62 into contact with the seat back 16.

Further, in the CR airbag 62, since the duct part 64 that is an inflated and deployed part is inflated and deployed in an inverse "V" character-like in a side view, in other word, since the duct part 64 forms a non-annular inflated and deployed form, a capacity of the inflated and deployed part is smaller compared with the duct parts 34 and 54 that form a rectangular frame shape. Therefore, the CR airbag 62 completes inflation and deployment in a further shorter time from an operation start of the inflator 32 and contributes to improving the occupant protection performance.

<Fourth Embodiment>

A CR airbag device 70 according to a fourth embodiment of the present invention will be described based on FIG. 6A and FIG. 6B. In FIG. 6A, a schematic entire structure in an operation state of the CR airbag device 70 is shown in a schematic side view, and in FIG. 6B, a schematic entire structure in an operation state of the CR airbag device 70 is shown in a schematic plan view. As shown in these drawings, a CR airbag 72 as an airbag that forms the CR airbag device 70 is different from the first embodiment in a point that the duct part 74 has an intermediate duct 74C as an intermediate deployed part that is inflated and deployed between a front duct 74F and a rear duct 74R. The instrument panel 20 shown with an imaginary line in FIG. 6A shows a shape in a near center in the vehicle width direction.

A duct part 74 of the CR airbag 72 includes the front duct 74F as a front deployed part, the rear duct 74R as a rear deployed part, an upper duct 74U as an upper deployed part, a lower duct 74L as a lower deployed part, and the intermediate duct 74C described above. The intermediate duct 74C is inflated and deployed along a up-and-down direction between the front duct 74F and the rear duct 74R in a longitudinal direction so as to run in parallel with the front duct 74F and the rear duct 74R.

Thus, the duct part 74 is inflated and deployed into a such shape that is formed by joining two rectangular frames back and forth in a side view. The duct part 74 except the intermediate duct 74C is formed in the same manner as the duct part 54 in the second embodiment.

Further, the CR airbag 72 includes a pair of front and back sheet-like deployed parts 76F and 76R that are deployed into near rectangle in a side view. A rim of a front sheet-like deployed part 76F is joined with center parts in the vehicle width direction of the front duct 74F, a front part of the upper duct 74U, the intermediate duct 74C, and the front part of the lower duct 74L over a nearly whole circumference by sewing or the like. On the other hand, a rim of a rear sheet-like deployed part 76R is joined with center parts in the vehicle width direction of the intermediate duct 74C, a rear part of the upper duct 74U, the rear duct 74R, and a rear part of the lower duct 74L over a nearly whole circumference by sewing or the like. The rear sheet-like deployed part 76R may not be disposed.

Therefore, the sheet-like deployed parts 76F and 76R are deployed in sheet by tensional force accompanying deployment of the duct part 74. The sheet-like deployed parts 76F and 76R are formed of, for example, a material that is the same as a base cloth that forms the duct part 74 or a net (net-like) raw material. Other structures of the CR airbag device 70 are formed the same as the CR airbag device 10 in the first embodiment including parts not shown in the drawings.

Therefore, also by the CR airbag device 70 according to the fourth embodiment, the same effect can be obtained by fundamentally the same operation as the CR airbag device 10 according to the first embodiment except the operation and effect due to that the front duct is formed of a pair of right and left cylindrical ducts.

Further, the CR airbag device 70 and the occupant protection device 100 that includes the CR airbag device 70, since the duct part 74 has the intermediate duct 74C, contribute to suppressing the head H of the seated occupant from rotating in the case of the very small lap impact or the diagonal impact. Regarding this point, a behavior of the seated occupant D in the driver's seat 12D in the case of the very small lap impact or the diagonal impact toward the assistant driver's seat 12P is complemented as an example.

Firstly, in a comparative example in which the CR airbag 70 is not included, although omitted from showing with the drawing, the head H of the seated occupant D moves forward while directing toward an impact side and comes into contact with the airbag 24A of the airbag device 24 for driver's seat at a position that is offset from the center in the vehicle width direction of the airbag 24A to the impact side. Then, while a contact site (left side part) of the head H with the airbag 24A is braked from moving forward, such a braking force does not act on a non-contact side (right side part) of the head H. Therefore, the head H rotates about the contact site (about an axis along a vertical direction) with the airbag 24A.

By contrast, in the present embodiment, the head H of the seated occupant D is, as shown in FIG. 6B, while contacting with a position that is offset to the impact side in the airbag 24A in a left side part of the head H, before the sheet-like deployed part guides the head H of the seated occupant, a right side part of the head H comes into contact with the intermediate duct 74C of the CR airbag 72. That is, the head H of the seated occupant D receives braking force on both sides of right and left by the airbag 24A and the intermediate duct 74C, thus, the head H is suppressed from rotating in comparison with the comparative example. Therefore, in the CR airbag device 70 and the occupant protection device 100, the occupant protection performance to the rotation of the head H associated with the impact is improved.

Although an example in which the intermediate duct 74C forms a cylinder along an up-and-down direction was shown in the fourth embodiment, the present invention is not limited thereto. For example, the intermediate duct 74C may be formed so as to be inflated and deployed into a posture inclined relative to an up-and-down direction. However, when the mechanism for suppressing the rotation of the head H described above is considered, an angle of inclination relative to an up-and-down direction is preferable to be small.

Further, in the respective embodiments described above, examples in which the inflator 32 is activated in the case of the very small lap impact and the diagonal impact were shown, the present example is not limited thereto. For example, the inflator 32 may be formed so as to be activated in one case of the very small lap impact and the diagonal impact. In this structure, in the case where the other of the very small lap impact and the diagonal impact occurs, another safety device protects the occupant.

Further, although examples in which the front ducts 64F and 74F are a single cylindrical duct were shown in the third and fourth embodiments, the present invention is not limited thereto. For example, in place of the front ducts 64F and 74F, the front duct 34F made of the pair of right and left front ducts 34FD and 34FP may be adopted.

Still further, although examples in which the sheet-like deployed parts 36, 66, 76F and 76R are included as the thin deployed part were shown in the respective embodiments described above, the present invention is not limited thereto. For example, a thin inflated and deployed part that is inflated and deployed thinner than the duct part in the vehicle width direction may be adopted as a thin deployed part. As such a thin inflated and deployed part, a structure that inflates by reception of gas supply from the inflator may be used, or a structure that inflates by taking in air in a cabin C accompanying the inflation and deployment of the duct part may be used.

Further, although examples in which the CR airbag devices 10, 50, 60 and 70 are housed in the overhead console 28 were shown in the respective embodiments described above, the present invention is not limited thereto. For example, a part or all of the CR airbag device 10 and the like may be disposed between a roof panel and a roof head lining.

Further, although application examples to vehicles V in which the sun roof device SR is disposed at the back of the overhead console 28 were shown in the respective embodiments described above, the present invention is not limited thereto. For example, the present invention may be applied to a vehicle in which the sun roof device SR is not disposed.

In this case, rear parts of the CR airbags 30, 52, 62 and 72 may be supported by the roof R.

Still further, although examples in which the rear ducts 34R, 54R and 74R or the diagonal duct 64S are inflated and deployed between right and left seat backs 16 were shown in the respective embodiments described above, the present invention is not limited thereto. For example, in the case of without the center console 18, the rear ducts 34R, 54R and 74R or the diagonal duct 64S may be formed to be inflated and deployed between right and left seat cushions 14 (arm rests disposed thereon).

Further, although operations at the time of the front impact to a position that is offset on one side in the vehicle width direction such as the very small lap impact, the diagonal impact or the like were described in the respective embodiments described above, for example, also in the case where the inflator 32 is activated at the time of the side impact, the occupant protection performance can be improved. That is, at the time of the side impact, the seated occupant is suppressed from interfering with the seat back 16 of an adjacent seat (vehicle sheet 12) and an adjacent occupant by the deployed CR airbags 30, 52, 62 and 72. However, the function may be exerted by another airbag disposed to, for example, an inside end in the vehicle width direction of the seat back 16, the center console 18, a center part before and after the roof, or the like. In other words, in the respective embodiments, a structure in which the inflator 32 is not activated at the time of the side impact may be formed.

Other than the above, it goes without saying that the present invention can be executed by variously modifying in the range that does not deviate from the gist of the present invention.

What is claimed is:

1. A roof airbag device comprising:
    a roof airbag housed in a part that includes a front end side in a vehicle longitudinal direction in a center part in a vehicle width direction of a roof,
    wherein the roof airbag includes: a front deployed part that is inflated upon reception of a gas supply and is deployed in front in a vehicle longitudinal direction with respect to an occupant such that a lower end side in a vehicle up-and-down direction overlaps with an instrument panel in an up-and-down direction in a rear view;
    a rear deployed part that is inflated upon reception of the gas supply and is at least partially deployed between right and left seats; and
    a thin deployed part that is deployed in a state connected with an inflated and deployed part that includes the front deployed part and the rear deployed part and surrounded by the inflated and deployed part, and in non-inflation or in inflation at a thickness thinner than an inflation width of the inflated and deployed part in a vehicle width direction,
    wherein the thin deployed part extends between a rear surface of the front deployed part, in the vehicle longitudinal direction, and a front surface of the rear deployed part, in the vehicle longitudinal direction,
    wherein the front deployed part is formed by including a pair of cylindrically deployed parts that are inflated and deployed on both sides of right and left with respect to the thin deployed part.

2. The roof airbag device according to claim 1, wherein the inflated and deployed part is formed by including an upper deployed part that connects between upper ends of the pair of cylindrically deployed parts and the rear deployed part in the vehicle up-and-down direction and a lower deployed part that connects between lower ends of the pair of cylindrically deployed parts and the rear deployed part in the vehicle up-and-down direction; and the thin deployed part is connected to at least each of the pair of cylindrically deployed parts, the upper deployed part and the lower deployed part.

3. The roof airbag device according to claim 2, wherein the inflated and deployed part is formed by further including an intermediate deployed part that connects the upper deployed part and the lower deployed part.

4. The roof airbag device according to claim 1, wherein the rear deployed part is formed by inclining such that a front part is positioned above in the vehicle up-and-down direction, compared with a rear part in the vehicle longitudinal direction, and at least as a part of diagonal cylindrical deployed part in which an upper end in the vehicle up-and-down direction connects with upper ends of the pair of cylindrically deployed parts in the vehicle up-and-down direction.

5. The roof airbag device according to claim 1, wherein the thin deployed part is formed of a cloth-like member or a mesh-like member.

6. The roof airbag device according to claim 1, wherein the roof airbag is housed in an overhead console disposed in a front end of the roof in a vehicle longitudinal direction in a center part in the vehicle width direction.

7. The roof airbag device according to claim 1, wherein a gas supply passage of the roof airbag has a partition structure that promotes a gas flow toward the rear deployed part than the pair of cylindrically deployed parts.

8. The roof airbag device according to claim 7, wherein the partition structure is formed of a tether.

9. An occupant protection device comprising:
an airbag device for a front seat, which is disposed in front of a seat and inflates and deploys a front impact airbag by gas supply at the time of occurrence of a front impact and at the time of a front impact at a position that is offset to one side in a vehicle width direction in a vehicle front part; and
the roof airbag device according to claim 1, which inflates and deploys the roof airbag by gas supply at the time of the front impact at a position that is offset to one side in a vehicle front part in a vehicle width direction.

10. A roof airbag device comprising:
a roof airbag housed in a part that includes a front end side in a vehicle longitudinal direction in a center part in a vehicle width direction of a roof,
wherein the roof airbag includes:
a front deployed part that is inflated upon reception of a gas supply and is deployed in front in a vehicle longitudinal direction with respect to an occupant such that a lower end side in a vehicle up-and-down direction overlaps with an instrument panel in an up-and-down direction in a rear view;
a rear deployed part that is inflated upon reception of the gas supply and is at least partially deployed between right and left seats; and
a thin deployed part that is deployed in a state connected with an inflated and deployed part that includes the front deployed part and the rear deployed part and surrounded by the inflated and deployed part, and in non-inflation or in inflation at a thickness thinner than an inflation width of the inflated and deployed part in a vehicle width direction, wherein the rear deployed part is formed by inclining such that a front part is positioned above in the vehicle up-and-down direction, compared with a rear part in a vehicle longitudinal direction, and at least as a part of diagonal cylindrical deployed part in which an upper end in the vehicle up-and-down direction connects with an upper end of the front deployed part in the vehicle up-and-down direction.

11. The roof airbag device according to claim 10, wherein the front deployed part is formed as a single cylindrically deployed part.

12. The roof airbag device according to claim 10, wherein the thin deployed part is formed of a cloth-like member or a mesh-like member.

13. The roof airbag device according to claim 10, wherein the roof airbag is housed in an overhead console disposed in a front end of the roof in the vehicle longitudinal direction in a center part in the vehicle width direction.

14. A roof airbag device comprising:
a roof airbag housed in a part that includes a front end side in a vehicle longitudinal direction in a center part in a vehicle width direction of a roof,
wherein the roof airbag includes:
a front deployed part that is inflated upon reception of a gas supply and is deployed in front in a vehicle longitudinal direction with respect to an occupant such that a lower end side in a vehicle up-and-down direction overlaps with an instrument panel in an up-and-down direction in a rear view;
a rear deployed part that is inflated upon reception of the gas supply and is at least partially deployed between right and left seats;
a thin deployed part that is deployed in a state connected with an inflated and deployed part that includes the front deployed part and the rear deployed part and surrounded by the inflated and deployed part, and in non-inflation or in inflation at a thickness thinner than an inflation width of the inflated and deployed part in a vehicle width direction; and
a gas supply passage that includes has a partition structure that promotes a gas flow toward the rear deployed part than the front deployed part, the partition structure is formed of a tether.

15. The roof airbag device according to claim 14, wherein the front deployed part is formed as a single cylindrically deployed part.

16. The roof airbag device according to claim 14, wherein the thin deployed part is formed of a cloth-like member or a mesh-like member.

17. The roof airbag device according to claim 14, wherein the inflated and deployed part is formed by including an upper deployed part that connects between upper ends of the front deployed part and the rear deployed part in the vehicle up-and-down direction and a lower deployed part that connects between lower ends of the front deployed part and the rear deployed part in the vehicle up-and-down direction,
wherein the thin deployed part is connected to at least each of the front deployed part, the upper deployed part and the lower deployed part,
wherein the inflated and deployed part is formed by further including an intermediate deployed part that connects the upper deployed part and the lower deployed part.

18. The roof airbag device according to claim 14, wherein the roof airbag is housed in an overhead console disposed in a front end of the roof in a vehicle longitudinal direction in a center part in the vehicle width direction.

19. The roof airbag device according to claim 14, wherein a front end of the thin deployed part, in the vehicle longitudinal direction, is connected to the rear surface of the front deployed part and a rear end of the thin deployed part, in the vehicle longitudinal direction, is connected to the front surface of the rear deployed part.

* * * * *